2244X
B. E. Feyrnuth.
Time Alarm.
Patented Dec. 22, 1814.
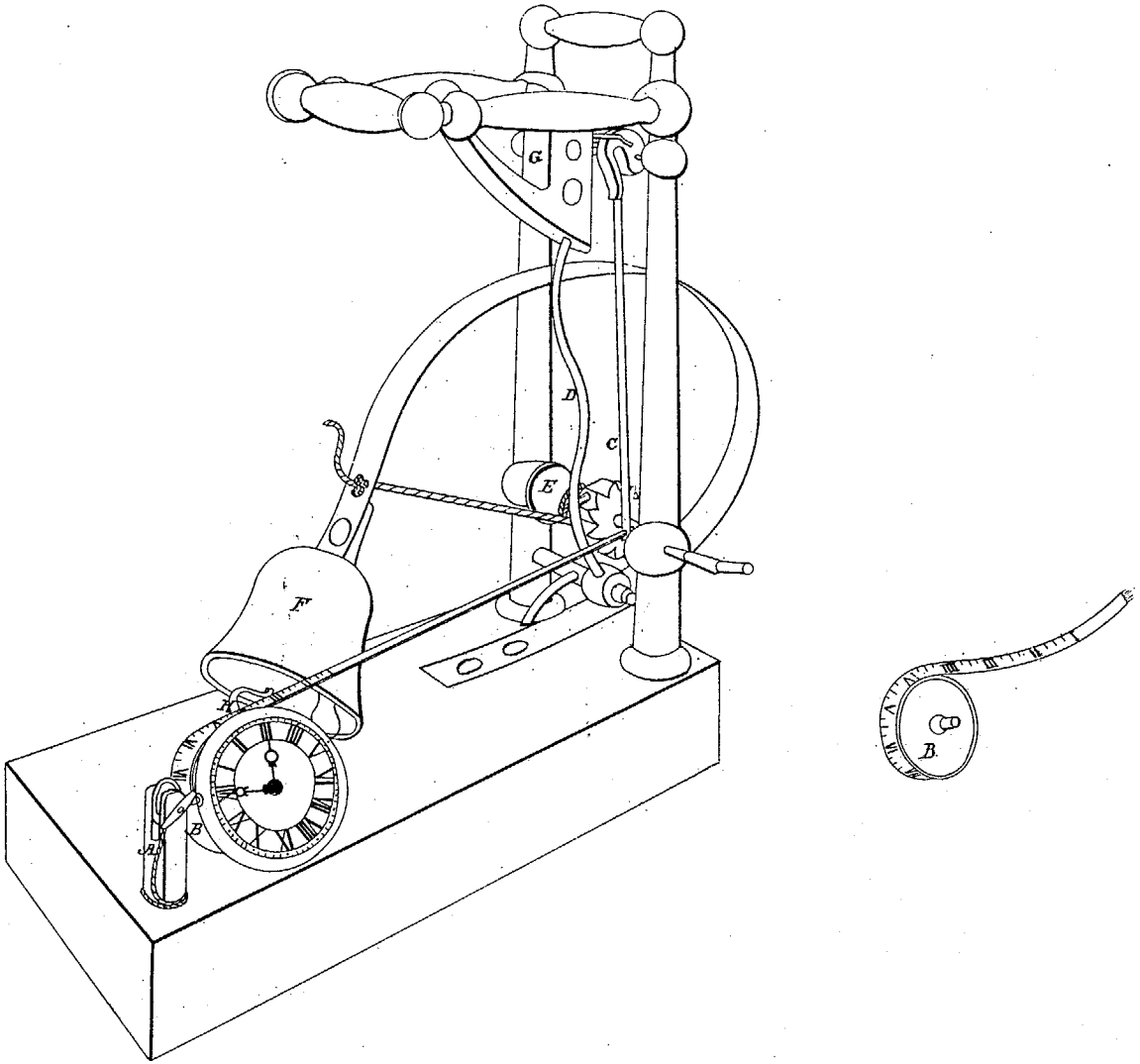

[illegible]

Benjamin C. [illegible] 2244

The Schedule referred to in these Letters Patent and making part
of the same containing a description in the words of the said Benjamin C.
[illegible] himself of his Alarm to be fixed to a Clock or Watch —

---

Let there be provided a block of wood or other substance provided of suff-
-cient weight to give it stability, this block should be about eight inches
long four wide and three thick, more or less. Let there be a small stud
raised near one end, with a groove or mortice in it to receive the pendule of
a watch so that it may stand securely on one edge, the outer case of the watch
must be taken off, and the back of the watch be turned towards the middle of
the block. Then take a small cilindrical piece of wood, cork or other substa[nce]
of about half an inch in diameter and some what longer; into the centre
this let there be screwed, at one end a gudgeon, with a socket in the outer
end similar to the pipe of a watch key and exactly to fit the fuzee Arbor of
the watch as its key does. The cork cylinder, on the other end of the pipe or
gudgeon, is to have a narrow piece of oiled or varnished ribbon or tape,
fastened to it, this is to be marked with the hours, as the cylinder is turned [by]
the fuzee arbour in the running down of the watch; as the tape is wound
round the small cylinder. The other end of the tape is fastened to the low[er]
end of a lever of about nine inches long from the fulcrum leaving the upp[er]
end of the lever about an inch and a half long. This lever is supported by
a roller turning on gudgeons in two upright posts, of a suitable length,
fixed firmly in the platform or block below. Near the lower part of the
posts is another roller turning with its gudgeons on the posts on this roller
is fixed a ratchet wheel and near one end a small pulley, round which
passes a cord, fastened to the pulley by one end, and to the spring of a com-
-mon house bell by the other end. The spring is drawn up by winding the
cord round the pulley, and is kept in that position by a dog or ketch which
falls into the ratchet wheel. If the alarm is required to ring after the 214 [illegible]

tape, say of six hours, let the figure 6 on the tape be brought opposite a small
wire Index pointing to the top of the cylinder round which the tape is wound
The remaining part of the tape between the roller and the end of the lever to
which it is fastened, will be so slack that it will take six hours to wind it
round the roller so as to tighten it, at which time the tape drawing the end
of the lever, will by means of another, acted on by the first, disengage the latch
from the ratchet wheel, let loose the bell spring, & by its vibration ring the
bell and give the desired alarm —

Sgd. Witnesses
[illegible] Wm. Freymuth
Jacob Baker

Benjn. C. Freymuth (540 wds)

Patented December 22d. 1814.

Drawing in Portfolio